Sept. 8, 1970          E. S. BETTIS          3,527,669
MOLTEN-SALT-FUELED NUCLEAR BREEDER REACTOR
AND FUEL CELL FOR USE THEREIN Filed May 20, 1968          2 Sheets-Sheet 2

INVENTOR.
Edward S. Bettis
BY
ATTORNEY.

United States Patent Office 3,527,669
Patented Sept. 8, 1970

3,527,669
MOLTEN-SALT-FUELED NUCLEAR BREEDER REACTOR AND FUEL CELL FOR USE THEREIN
Edward S. Bettis, Knoxville, Tenn., assignor to the United States of America as represented by the United States Atomic Energy Commission
Filed May 20, 1968, Ser. No. 730,466
Int. Cl. G21c 3/54
U.S. Cl. 176—18                                    6 Claims

ABSTRACT OF THE DISCLOSURE

A molten-salt-fueled nuclear breeder reactor comprising a multiplicity of vertically oriented graphite fuel cells arranged in a bundle to form an active core region. Each cell comprises three concentric tubulations with axially extending passageways therebetween as well as through the innermost tubulation. The passageways provide a separate circuit for molten salt containing fissile material and for molten salt containing fertile material. A blanket region surrounds the active core region and reactivity control is achieved by displacement of molten salt containing fertile material within the interstices of the fuel cells.

BACKGROUND OF THE INVENTION

The invention described herein relates generally to nuclear reactors, and more particularly to a molten-salt-fueled breeder reactor and fuel cell for use therein. It was made in the course of, or under, a contract with the U.S. Atomic Energy Commission.

As used in this application, the following terminology is defined below:

Active core region: The inner portion of a nuclear reactor which contains fissile material and is characterized by a multiplication constant greater than or equal to unity during reactor operations.

Blanket region: The region immediately surrounding the active core region containing fertile material for conversion into fissile material by neutron capture.

Fissile material: Material which will undergo fission with neutrons of any energy.

Fertile material: Material which can be converted into fissile material through neutron capture.

Breeder reactor or breeder: A nuclear reactor which produces fissile material from fertile material. Further limited herein to reactors producing more fissile material than they consume.

In the design of a molten-salt-fueled breeder reactor, it is necessary to utilize graphite core components because of the good structural and nuclear properties of graphite. Thermal and irradiation induced graphite growth and shrinkage provide problems which must be overcome in graphite components, however, before such reactor systems can be deemed acceptable. One such problem occurs where separate streams of molten salt containing fissile material and molten salt containing fertile material pass through the active core region. Because of the large neutron absorption cross section of the fertile material, only a predetermined volume percentage of the active core region can be occupied by molten salt containing fertile material without causing the reactor to undergo substantial reactivity fluctuations. Although this volume percentage may vary within limits depending upon the enrichment and concentration of fissile material in the active core region, once values have been selected for these parameters it is essential to the continued acceptable operation of the reactor that such volume percentage remain substantially constant.

It is therefore a primary object of the invention to provide a molten-salt-fueled breeder reactor design characterized by minimum reactivity fluctuations due to variations in fertile material present in the active core region thereof.

Another object of the invention is to provide a graphite fuel cell design which minimizes fuel and blanket salt variations caused by thermal and irradiation induced dimensional changes in graphite.

SUMMARY OF THE INVENTION

In accordance with the invention, a molten-salt-fueled nuclear breeder reactor and fuel cell for use therein are provided wherein a multiplicity of such fuel cells are arranged in a bundle to form the active core region of the reactor. Each fuel cell comprises three concentric tubulations with axially extending passageways therebetween as well as through the innermost tubulation. The passageways provide separate closed circuits for molten salt containing fissile material and for molten salt containing fertile material. The outermost tubulation is affixed to a tubesheet disposed above the active core region and is free to move axially with respect to the intermediate and innermost tubulations which are affixed to tubesheets disposed below the active core region. Such freedom of axial movement permits the fuel cells to compensate for graphite dimensional changes. Reactivity control is achieved by displacement of molten salt containing fertile material within the interstices of the fuel cells. A breeder reactor is thus provided wherein graphite core components are free to change dimension while causing only minimum reactivity fluctuations.

DESCRIPTION OF THE PREFERRED EMBODIMENT

Figure 1:
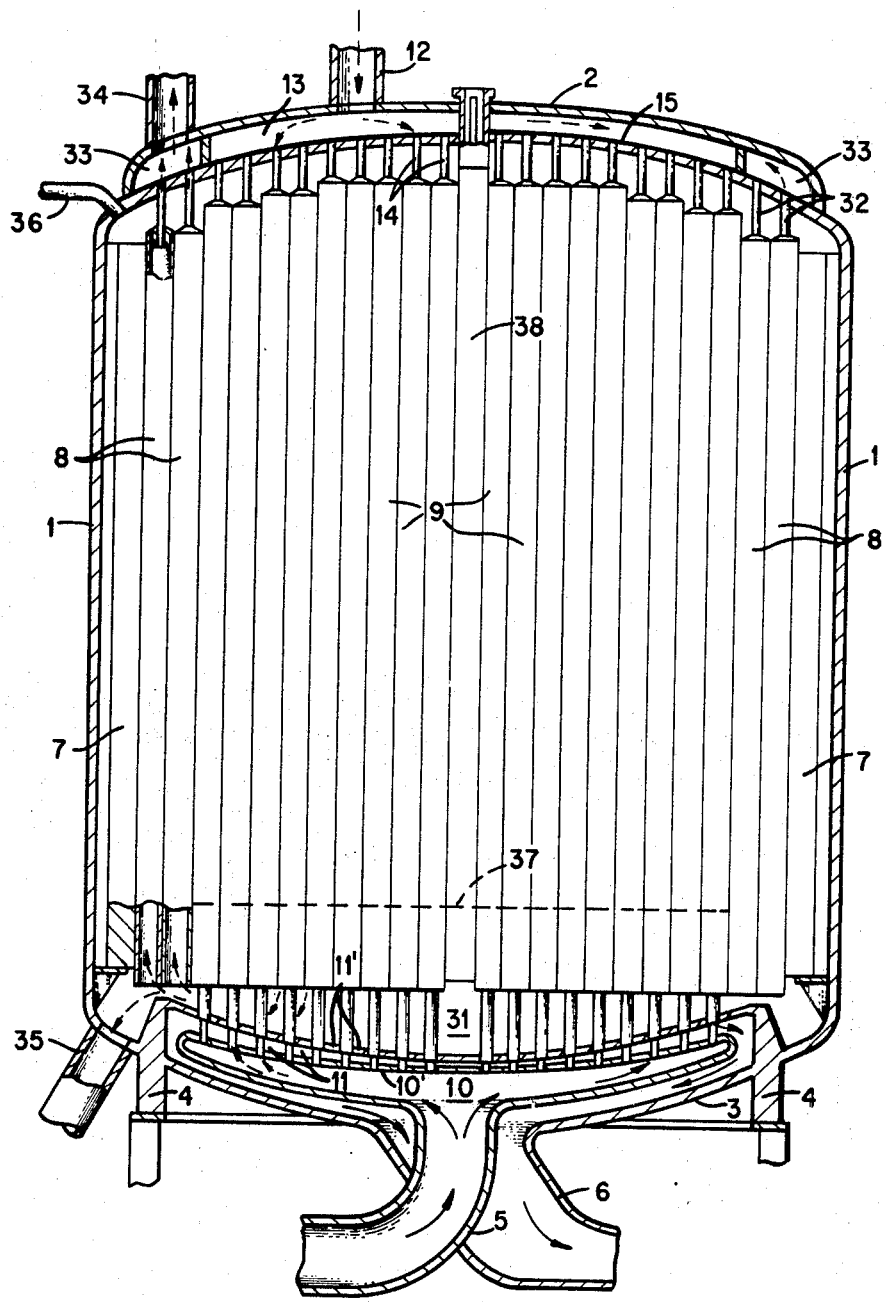
FIG. 1 shows schematically, in vertical section, a molten-salt-fueled breeder reactor designed in accordance with the invention.

A molten-salt fueled breeder reactor designed in accordance with the invention is illustrated in vertical section in FIG. 1. The reactor vessel comprises a cylindrical body 1 with dished heads 2 and 3 closing its top and bottom ends, respectively. A supporting ring 4 provides a mechanical mounting for the vessel and reactor components disposed therein. From the center of dished head 3 closing the bottom of the vessel, a fuel line comprising an outlet pipe 6 integrally joined to dished head 3 and an inlet pipe 5 passing through pipe 6 where it joins dished head 3, communicates with a fuel heat exchanger (not shown).

Inside the reactor vessel, a graphite reflector 7 and a radial blanket of hollow graphite tubes 8 surround an active core region comprising a multiplicity of vertically oriented elongated fuel cells 9. Fuel cells 9 will be described in greater detail in a later reference to FIGS. 2 and 3. Molten salt containing fissile material, hereafter referred to as fuel salt, is fed to and received from fuel cells 9 by way of concentrically disposed fuel salt inlet and outlet plenums 10 and 11, respectively. Fuel salt is supplied to the active core region through inlet pipe 5 which discharges into inlet plenum 10. From inlet plenum 10 the fuel salt circulates upwardly through fuel cells 9 before discharging into outlet plenum 11 and out through outlet pipe 6 to an external heat exchanger (not shown). Molten salt containing fertile material, hereafter referred to as blanket salt, is admitted to the top of the reactor by way of conduit 12 into blanket salt inlet plenum 13. Blanket inlet plenum 13 feeds blanket salt to fuel cells 9 through metal feeder tubes 14 which also serve to provide radial and axial support to the fuel cells. Each feeder tube 14 is metallurgically bonded to tubesheet 15, which forms the bottom surface of blanket salt inlet plenum 13, and to plug 16 closing the top of each fuel cell.

Figure 2:
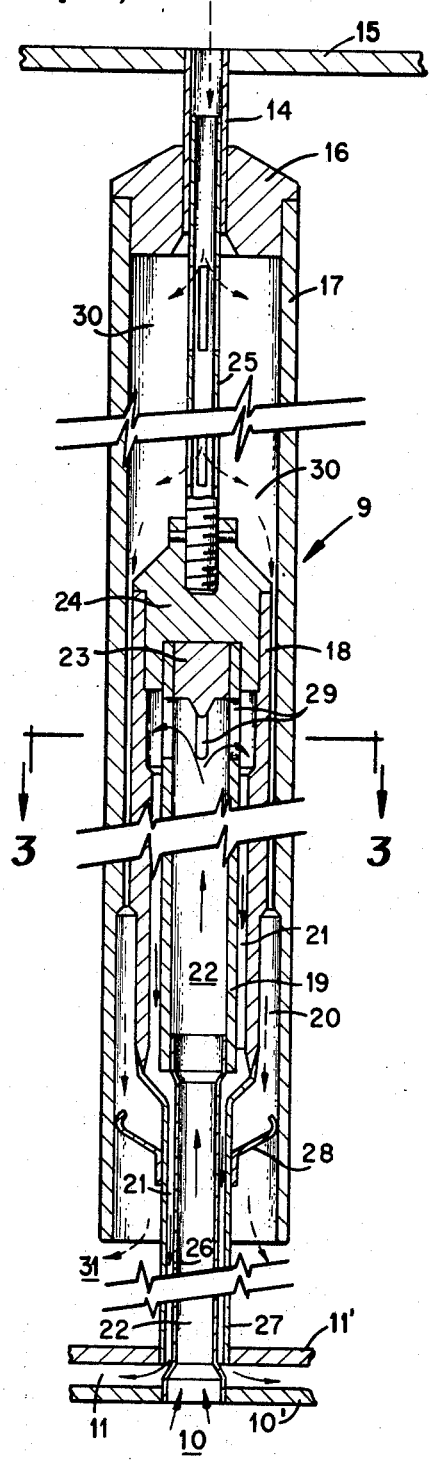
FIG. 2 is a vertical sectional view of a fuel cell used in the reactor of FIG. 1.
Figure 3:
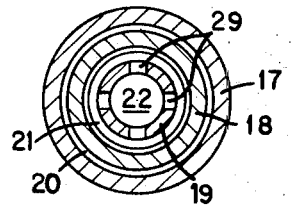
FIG. 3 is a horizontal sectional view of the fuel cell of FIG. 2.

Fuel cells 9, one of which is shown in greater detail in the vertical and horizontal sectional views of FIGS. 2 and 3, are each fabricated of concentrically disposed outer, intermediate, and inner graphite tubulations 17, 18 and 19, respectively, providing flow channels 20, 21 and 22. Inner and outer graphite plugs 23 and 24 close the top ends of tubulations 18 and 19 and support them in a concentric spaced-apart relationship. A slotted tubular extension 25 threadably engages outer graphite plug 24 and extends upwardly therefrom to slidably engage the inside of feeder tube 14. A tubular metal inlet extension 26 and a concentrically disposed tubular metal outlet extension 27 engage the lower ends of the innermost and intermediate tubulations 19 and 18, respectively, to provide axial and radial support thereto while extending flow channels 22 and 21 to their respective plenums 10 and 11. The lower ends of extensions 26 and 27 are metallurgically bonded to tubesheets 10' and 11' which form the top surface of plenums 10 and 11, respectively. Spring metal spacers 28 affixed to extension 27 extend radially outward to slidably engage tubulation 17 and provide radial support thereto.

Fuel salt entering inlet plenum 10 flows upwardly through the inner flow channel 22 to the uppermost part of the active core region where it passes through apertures 29 to flow channel 21. The fuel salt then flows downwardly by way of flow channel 21 and discharges into outlet plenum 11. From plenum 11 the fuel salt passes through outlet pipe 6 to a heat exchanger (not shown). The fuel salt discharging into outlet plenum 11 has been raised to an elevated temperature as a result of fission reactions occurring therein during its passage through fuel cells 9.

As shown by the broken flow arrows in the figures, blanket salt enters fuel cells 9 from blanket plenum 13 through feeder tubes 14 and slotted tubular extensions 25. A cavity 30 is provided in the top portion of each fuel cell to retain a volume of blanket salt above the active core region and thereby provide an upper axial blanket thereto. The blanket salt flows from cavity 30 downwardly through flow channel 20 into a lower axial blanket which occupies region 31 below the active core region. The blanket salt then flows radially outward to hollow graphite tubes 8, where a minor portion flows upward and out through tubes 32 into a blanket salt discharge plenum 33. From discharge plenum 33, the blanket salt flows out through conduit 34 to a heat exchanger (not shown). The major portion of blanket salt exits the reactor by way of conduit 35, near the bottom of the reactor.

Each of the above described fuel cells is designed to operate satisfactorily despite dimensional changes in its graphite components. Axial shrinkage is accommodated by the sliding engagement of tubular extension 25 with feeder tube 14 and the sliding engagement of spring spacers 28 with tubulation 17. Any irradiation or thermal induced dimensional changes in the graphite fuel cell components will not significantly affect the relative spcing between tubulations 17, 18 and 19, so that the ratio of fuel to blanket salt within the active core region will remain substantially constant. Such a constant ratio aids the reactivity stability of the reactor despite graphite growth or shrinkage, thereby simplifying control requirements and ensuring continuing operation at or near optimum design conditions.

Reactivity control of the reactor is based upon the large negative reactivity contribution of blanket salt when present in the active core region. Blanket salt is permitted to fill the interstices of fuel cells 9 to a level which provides the desired reactivity condition. Under shut-down conditions, for example, the blanket salt rises to a level near the vertical mid-point of the active core region to make it subcritical. A higher or lower level may be necessary in any given instance and the mid-point is selected as illustrative only. In order for the reactor to become critical, pressurized displacement gas is injected into the reactor at any convenient point, inlet 36, for example, to displace the blanket salt filling the fuel cell interstices downward to a level indicated on FIG. 1 by the broken line 37. This level is also chosen for illustrative purposes and may be varied for particular embodiments. Minor variations in the blanket salt level within the fuel cell interstices may be used as a means for fine control of the reactivity. In event of an emergency shut-down, the release of the displacement gas from the reactor will automatically permit the level of blanket salt in the fuel cell interstices to raise and cause the reactor to become subcritical. Additional reactivity control may be provided by a centrally disposed hollow graphite cylinder 38 through which a control rod containing neutron absorbing material may be driven.

Corrosion resistant base alloys such as those described in U.S. Pat. No. 2,921,850 are suitable for metal core components such as tubular extensions 26 and 27, tubes 14, and tubesheet 15. Other reactor components such as ring 4, the reactor vessel and all piping which is exposed to either the fuel or blanket salt may be fabricated from the same alloys.

The above description of the invention was offered for illustrative purposes only, and should not be interpreted in a limiting sense. It is intended rather that the invention be limited only by the claims appended hereto.

What is claimed is:

1. A molten-salt-fueled breeder reactor comprising:
    (1) a multiplicity of elongated, vertically oriented fuel cells arranged in a bundle, each of said fuel cells comprising:
        (a) a nested arrangement of spaced-apart inner, intermediate, and outer graphite tubulations, a first passageway being defined by the interior surface of said inner tubulation, a second passageway comprising the annular spacing between said inner and intermediate tubulations, and a third passageway comprising the annular spacing between said intermediate and outer tubulations;
        (b) first closure means engaging the upper ends of said inner and intermediate tubulations, said inner tubulation being provided with at least one perforation at a point adjacent said closure means to provide fluid communication between said first and second passageways;
        (c) means engaging the lower ends of said inner and intermediate tubulations for providing support thereto and for effecting the passage of fuel salt through said first and second passageways;
        (d) means engaging the upper end of said outer tubulation for providing support thereto and for effecting the passage of blanket salt through said third passageway;
        (e) means for providing radial support to the upper ends of said inner and intermediate tubulations while permitting unrestrained axial movement thereof; and
        (f) means for providing radial support to the lower end of said outer tubulation while permitting unrestrained axial movement thereof; and
    (2) means for varying the reactivity of said reactor by varying the volume of blanket salt present in the active core region thereof.

2. The reactor of claim 1 wherein said means engaging the lower ends of said inner and intermediate tubulations comprises first and second tubesheets disposed below said tubulations, and first and second concentric metal tubulations affixed to and communicating between said inner and intermediate tubulations and said first and second tubesheets, respectively.

3. The reactor of claim 1 wherein said means engaging the lower ends of said inner and intermediate tubulations comprises first and second tubesheets disposed below said tubulations, and first and second concentric tubulations affixed to and communicating between said inner and intermediate tubulations and said first and second tubesheets, respectively; and wherein said means for providing radial support to the lower end of said outer tubulation while permitting unrestrained axial movement thereof comprises at least one spring metal spacer affixed to said second concentric metal tubulation and slidably engaging said outer tubulation.

4. The reactor of claim 1 wherein said means engaging the upper end of said outer tubulation comprises a third tubesheet disposed above said outer tubulation, a plug fixed to the upper end of said outer tubulation, and a metal tube affixed to and communicating between said third tubesheet and said plug, said tube passing through said plug to provide fluid communication between the interior of said outer tubulation and the area immediately above said third tubesheet.

5. The reactor of claim 1 wherein said means engaging the upper end of said outer tubulation comprises a third tubesheet disposed above said outer tubulation, a plug fixed to the upper end of said outer tubulation, and an open ended metal tube affixed to and communicating between said third tubesheet and said plug, said tube passing through said plug to provide fluid communication between the interior of said outer tubulation and the area immediately above said third tubesheet; and wherein said means for providing radial support to the upper ends of said inner and intermediate tubulations while permitting unrestrained axial movement thereof comprises an open ended perforated tubular extension extending upwardly from said tubulations, said perforated tubular extension slidably engaging the interior surface of said metal tube communicating between said third tubesheet and said plug.

6. The reactor of claim 1 wherein said means for varying the reactivity of said reactor by varying the volume of blanket salt present in the active core region thereof comprises: blanket salt being disposed in the interstices of said fuel cells, and inlet means for providing pressurized gas to displace said molten salt downward to a level which provides the desired reactivity.

References Cited

UNITED STATES PATENTS

| | | | |
|---|---|---|---|
| 3,262,856 | 7/1966 | Bettis | 176—18 |
| 3,403,076 | 9/1968 | Bettis | 176—18 |

BENJAMIN R. PADGETT, Primary Examiner

H. E. BEHREND, Assistant Examiner

U.S. Cl. X.R.

176—49, 68